(12) United States Patent
Codet et al.

(10) Patent No.: US 7,693,281 B2
(45) Date of Patent: Apr. 6, 2010

(54) METHOD FOR DISTRIBUTING SCRAMBLED DIGITAL DATA DECRYPTION KEYS

(75) Inventors: Andre Codet, Rennes (FR); Pierre Fevrier, St. Sulpice la Foret (FR); Noel Fontaine, St. Gilles (FR)

(73) Assignee: France Telecom, Paris (FR)

( * ) Notice: Subject to any disclaimer, the term of this patent is extended or adjusted under 35 U.S.C. 154(b) by 1066 days.

(21) Appl. No.: 10/495,439

(22) PCT Filed: Dec. 3, 2002

(86) PCT No.: PCT/FR02/04150

§ 371 (c)(1),
(2), (4) Date: May 25, 2004

(87) PCT Pub. No.: WO03/049442

PCT Pub. Date: Jun. 12, 2003

(65) Prior Publication Data

US 2005/0002527 A1  Jan. 6, 2005

(30) Foreign Application Priority Data

Dec. 5, 2001 (FR) .................................... 0115721

(51) Int. Cl.
*H04N 7/167* (2006.01)
(52) U.S. Cl. ...................... 380/239; 380/210; 380/241; 380/242
(58) Field of Classification Search ......... 380/210–212, 380/228, 239, 241–242
See application file for complete search history.

(56) References Cited

U.S. PATENT DOCUMENTS 5,270,809 A * 12/1993 Gammie et al. ............. 725/114
2002/0083438 A1 * 6/2002 So et al. ...................... 725/31

FOREIGN PATENT DOCUMENTS

| EP | 755 154 | 1/1997 |
| WO | 01/95613 | 12/2001 |
| WO | 03/039153 | 5/2003 |

* cited by examiner

*Primary Examiner*—Benjamin E Lanier
(74) *Attorney, Agent, or Firm*—Oblon, Spivak, McClelland, Maier & Neustadt, L.L.P.

(57) ABSTRACT

An apparatus and associated methodology are provided for distributing individual keys for deciphering scrambled digital data transmitted by a broadcasting system to a plurality of terminals connected to a data exchange network. The broadcasting system includes at least one portal designed to provide the individual keys, at least one scrambling platform and at least one server designed to broadcast the scrambled data. The scrambling period of the data is divided and transmitted into a succession of encoding periods $CP_i$, each defining a period of validity of an individual key Ki. A set of individual keys are supplied at each connection of a terminal to the portal. The set of individual keys includes at least one key corresponding to the encoding period $CP_i$, and at least one key corresponding to the encoding period $CP_i+1$. The terminal has also provided the date of a future connection to collect a set of deciphering keys corresponding to at least a future encoding period if the continuation of the access is authorized.

15 Claims, 5 Drawing Sheets

METHOD FOR DISTRIBUTING SCRAMBLED DIGITAL DATA DECRYPTION KEYS

TECHNICAL FIELD

This invention concerns the field of access control and more particularly a process for distributing individual keys for deciphering scrambled digital data transmitted by a broadcasting system with a plurality of terminals connected to a data exchange network, the said system comprising at least one reservation portal designed to provide the individual keys, at least one scrambling platform and at least one server designed to broadcast the scrambled data.

The invention also concerns a device designed to implement this process.

STATE OF THE PRIOR ART

In the field of data broadcasting, and in particular audiovisual data, the DVB (Digital Video Broadcasting) standard provides an access control mechanism in which the scrambling/deciphering information is transmitted to the subscribers with ECM and EMM access control messages (respectively Entitlement Control Message and Entitlement Management Message) and it is stored on a memory card or used by the latter. This information includes a CW encoded control word which changes periodically, every ten seconds for example. A new control word corresponding to the same programme or to a new programme is transmitted to the subscribers with the ECMs.

The EMMs are transmitted prior to the programmes to which they apply and are memorised on a chip card.

When a decoder receives an EMM containing the encoded entitlement key matching its group, it checks if this key has already been memorised. If not, the entitlement key is deciphered by the inverse function of the scrambling function and then stored. In general, the decoder consists of a terminal and a memory board incorporating the security processor. And when the scrambled programme is broadcast, the entitlement key is used to decipher the CW control word that is associated with it and which is sent to the subscribers via the ECMs, or incorporated into the initialisation of the receiver.

In the system described above, to access the scrambled programmes, a subscriber must have equipment, which generally includes a security processor incorporated into a memory board containing the access parameters that define the access rights to the scrambled programmes.

This access control system is not suited to broadcasting via the internet network, as it is not possible to envisage distributing chip card readers to each user connected to the networks due to the high number of potential subscribers and the geographical spread of these subscribers.

FIG. 1 is a diagrammatical representation of a broadcasting system via the Internet network 2 of scrambled theme channels or audiovisual programmes to terminals 4 which do not necessarily have security processors.

This system is described in a French patent application n° 0113963 entitled "BROADCASTING PROCESS AND SYSTEM WITH ACCESS CONTROL TO CODED PROGRAMMES IN AN IP TYPE NETWORK" registered by France Télécom on 29 Oct. 2001.

This system includes a multicast broadcasting server 6, connected to an audiovisual programme receiving antenna 8 or to a database 10 or even to a television programme source such as a camera 12. The server 6 is also connected to an audiovisual programme reservation portal 14 and to a scrambling platform 16.

The reservation portal 14 is a computer containing software that can manage a presentation page of an audiovisual programme commercial offer and that can generate reservation numbers for the access rights to these programmes.

The portal 14 also comprises an encoding software programme featuring an encoding function G that allows individual keys to be calculated.

The customer terminals 4 comprise a software programme that uses a deciphering function that permits the CW control words to be reconstituted.

The security of the transmissions in this system is based, on the one hand on the distribution of one or more individual keys to each terminal 4, and on the other hand, on the simultaneous broadcasting with the descrambling programme of an ALEA1 data common to all customers. The terminal 4 can only calculate the CW control word after receipt of the random data ALEA1, which is to say only at the moment when it needs it to descramble the data received.

The initialisation of the scrambling/descrambling function is carried out, on the one hand with the CW control word, and on the other hand, with a second random data ALEA2, transported in the signal to diversify the scrambling/descrambling sequences using a same CW control word.

In this way, the CW calculation cannot be carried out without an individual key and the individual address of a terminal 4. This permits the origin of an illegal duplication of an individual key to be detected, it being impossible to separate the latter from the unique identifier of the terminal 4 to which it has been associated. If such a fraud is detected, the faulty terminal 4 will be excluded from the distribution of the following sets of individual keys.

One main problem identified in the systems of the prior art described above is linked to the congestion of the transmission channel resulting from the large number of calls to be handled in the connected mode to distribute the individual keys to each user.

A first solution, used in the distribution of pay television programmes, consists in inserting the keys in a flow broadcast to all of the receivers, each receiver then filters the flow received so that only the key which concerns it is retained.

This solution has a disadvantage which arises from the fact that all of the terminals 4, whether connected to the network or not, must be addressed, as it is not possible to detect the disconnection of a terminal in a broadcasting context.

Furthermore, to ensure that all of the terminals 4 receive the message concerning them, these messages need to be sent several times. The bandwidth required to distribute the individual keys may then become very high in relation to the total bandwidth available.

The purpose of the invention is to overcome the disadvantages of the prior art described above by means of a process permitting the deciphering keys to be distributed without overloading the reservation portal, regardless of the number of customer terminals and without reducing the bandwidth used to broadcast the data.

PRESENTATION OF THE INVENTION

These objectives are achieved by means of a process comprising the following steps:
- divide the scrambling period of the data transmitted into a succession of encoding periods $CP_i$, each defining a period of validity of an individual key Ki,
- and at each connection of a terminal to the portal,
- supply to this terminal a set of individual keys comprising at least one key corresponding to the encoding period $CP_i$, and a key corresponding to the encoding period $CP_{i+1}$ as well as the date of a future connection to collect a set of deciphering keys corresponding to at least one future encoding period if the continuation of the access is authorised.

According to the invention, the duration of an encoding period varies depending on the number of terminals connected simultaneously to the reservation portal.

This duration depends on the capacities of the reservation portal without it being possible however that it is less than a minimum duration $CP_{min}$.

According to one preferred embodiment of the invention, connection to a terminal of the reservation portal is initialised by a connection request transmitted to the terminal of the portal.

According to one particular embodiment of the invention, the connection request is sent during the current encoding period, and the resulting future connection date is defined by the reservation portal for the encoding period $CP_{i+1}$ or for a later encoding period.

This date is defined by a time offset calculated with respect to a predefined time reference which is signalled to each terminal $P_i$ by the change of phase of a specific call trigger signal. This specific call trigger signal initialises a call distribution period DRA representing the time necessary to process the connection requests that occur during an encoding period $CP_i$. The connection requests are taken into account as from a change of state of the call trigger signal.

According to the invention, the change of phase of the specific call trigger signal is only carried out if the average number of NDMA calls inside a sliding time window of a predetermined fixed duration is lower than a predetermined call trigger threshold SDA.

According to the invention, the encoding period is only changed if the duration of a current encoding period $CP_i$ is greater than the minimum duration $CP_{min}$, and if the duration of the call distribution (DRA) is complete.

In one particular application of the process of the invention, the scrambled data represent an audiovisual programme.

In a variant of this application, the duration of an encoding period corresponds to the duration of the audiovisual programme.

The invention also concerns an individual key distribution signal, an emitter for transmitting this signal and a receiver for receiving this signal.

According to the invention, the signal comprises a series of encoding periods $CP_i$, each defining a duration of validity of an individual key Ki, each encoding period being able to vary between a minimum duration $CP_{min}$ and a maximum duration $CP_{max}$ depending on the number of terminals connected simultaneously to the network.

According to the invention, the signal comprises an indication of the connection date of a user to the network.

According to the invention, the said connection date is defined by a time offset with respect to a predefined time reference in the signal.

According to the invention, the said time reference is signalled to each terminal by a phase change of a specific call trigger signal.

According to the invention, the said call trigger signal initialises a duration of call distribution representing the time necessary to process the connection requests that occur during an encoding period $CP_i$.

The process according to the invention is used by an individual key distribution device to decipher the digital data broadcast by a broadcasting system comprising a reservation portal designed to provide the said keys, a scrambling platform and a server for the scrambled data.

This device is characterised by the fact that the reservation portal comprises:

means for dividing the data scrambling period into a series of encoding periods $CP_i$, each defining a duration of validity for an individual deciphering key Ki, means for defining for each terminal a connection date to the reservation portal and for providing each terminal connected with a set of individual keys comprising at least one key corresponding to the encoding period $Cp_i$ and at least one key corresponding to the following encoding period $CP_{i+1}$, as well as a future connection date to collect a set of deciphering keys corresponding to at least one future encoding period if the continuation of the access is authorised.

BRIEF DESCRIPTION OF THE DRAWINGS

Other characteristics and advantages of the invention will become clear from the following description, used by way of a non-restrictive example, in reference to the appended figures in which.

DETAILED PRESENTATION OF SPECIFIC EMBODIMENTS

Figure 1:
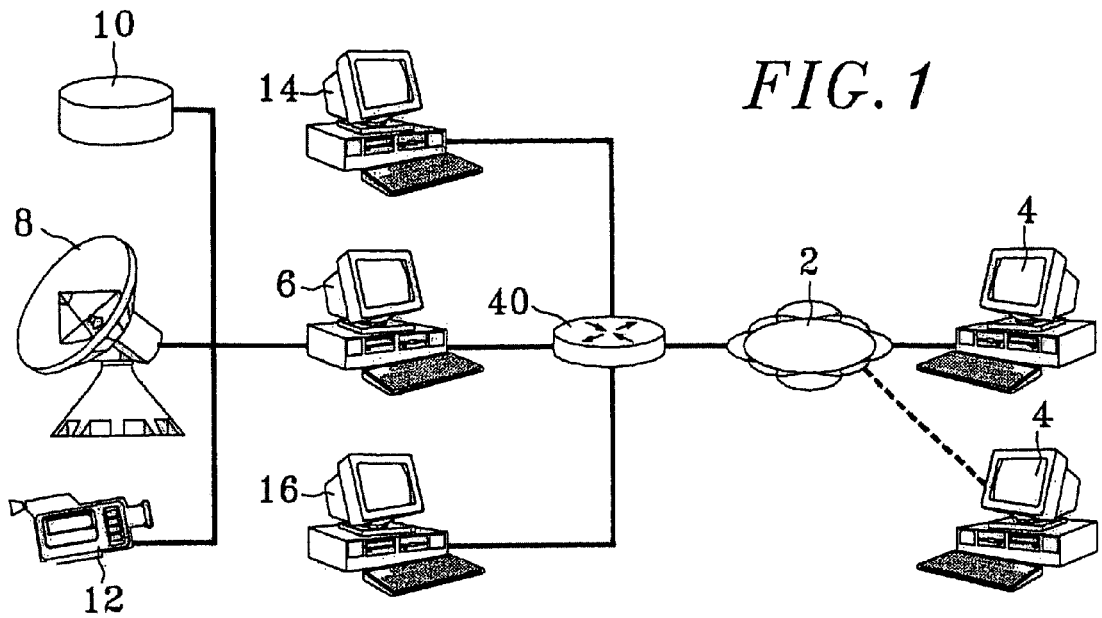
FIG. 1 represents a broadcasting system in which the process of the invention is used.

The following description will be made in reference to FIG. 1, previously described, as part of the broadcasting of audiovisual programmes, via the Internet network 2, to several terminals 4 by a programme server 6.

The scrambling period is divided into a series of encoding periods $CP_i$, each defining a duration of validity of an individual scrambling key Ki.

The change of encoding period is signalled by the change of state of a specific signal sent by the transmission point to each terminal 4.

The characteristics of these encoding periods $CP_i$ are defined when the television service is created and for a given service. They are memorised by the portal 14.

A defined encoding period $CP_i$ is characterised by:

A minimum duration $CP_{min}$ which will be that of all of the encoding periods created if there are not many users connected.

A maximum duration $CP_{max}$ representing an alarm threshold.

The duration $D_i$ of an encoding period $CP_i$, expressed in seconds, depends on the number of terminals 4 connected to the network without, however, it being less than $CP_{min}$. If the duration $D_i$ reaches $CP_{max}$, an alarm is then generated to alert the portal 14 that the duration $CP_{max}$ provided has been exceeded for the population connected. The portal 14 triggers a mechanism permitting the duration of the current encoding period to be increased beyond this value to absorb the current call rate. Frequent exceeding of $CP_{max}$ can be used by the operator to resize his portal equipment.

According to one essential characteristic of the invention, to collect the deciphering key Ki corresponding to the encoding period $CP_i$, each terminal 4 sends a connection request to the portal 14 so that the latter can provide a set of individual keys comprising at least one key corresponding to the encoding period $CP_i$ and at least one key corresponding to the encoding period $CP_{i+1}$ as well as the date of a future connection to collect a set of deciphering keys corresponding to at least one future encoding period if the continuation of the access is authorised.

Figure 2:
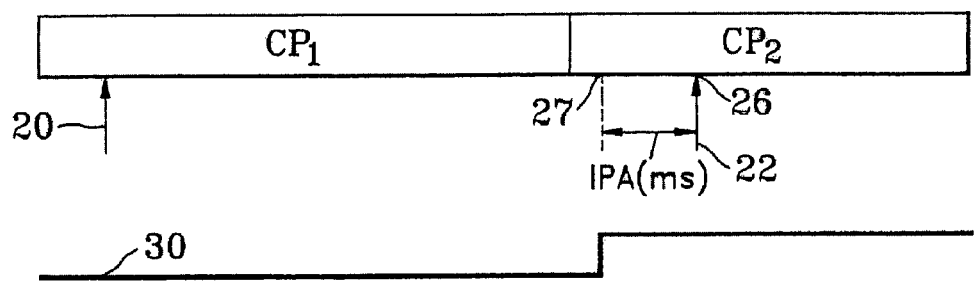
FIG. 2 illustrates diagrammatically the definition mode of a time reference for the dates of connection to the reservation portal according to the invention.

FIG. 2 represents diagrammatically two successive encoding periods, $CP_1$ and $CP_2$. The arrow 20 represents the instant in the encoding period $CP_1$, at which the terminal 4 is connected to the portal 14, and the arrow 22 indicates the call date 26 allocated by the portal 14 to the terminal 4 for a future connection. The date 26 is defined by a time offset IPA provided within $CP_1$, calculated from a reference date 27 determined according to the load on the portal 14.

According to another characteristic of the invention, the reference date 27 is signalled to each terminal 4 during the encoding period $CP_2$ by the change of phase of a specific call trigger signal 30 sent by the portal 14 to each terminal 4.

Distribution of the Call Date Requests

In order to anticipate the presence of calls for a new connection, during a given encoding period $CP_i$, the portal 14 calculates the future call dates for all of the terminals connected and plans the dates calculated in the following encoding period $CP_{i+1}$.

Figure 3:
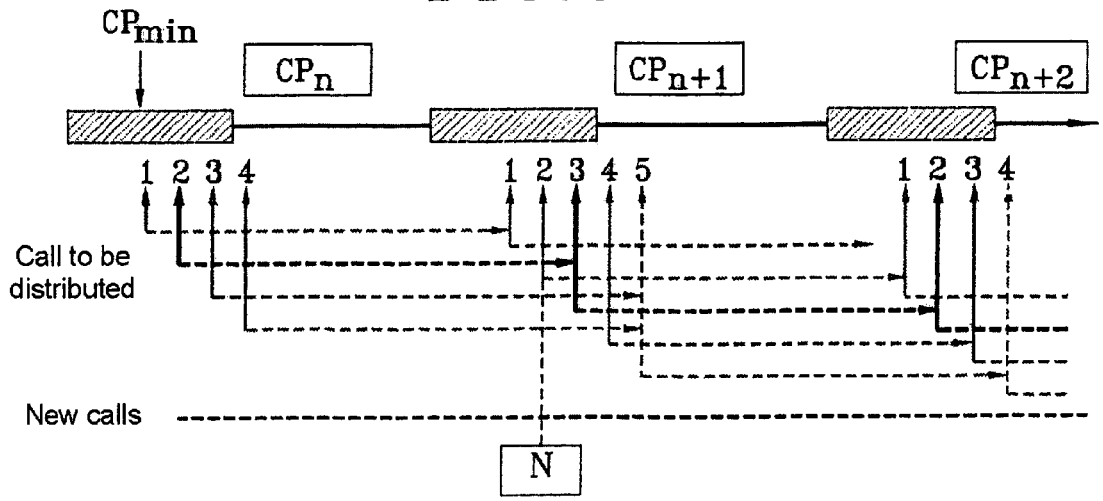
FIG. 3 illustrates the distribution of the dates defined according to the embodiment of FIG. 2.

FIG. 3 illustrates diagrammatically the mechanism used to carry out this distribution. In this mechanism, for a call of row n during the encoding period $CP_n$, there is a corresponding call row n in the encoding period $CP_{n+1}$. If a new call N occurs during the encoding period $CP_{n+1}$, it is immediately handled.

In the example illustrated by FIG. 3, the call dates of four terminals are distributed during three successive encoding periods respectively referenced by $CP_n$, $CP_{n+1}$ and $CP_{n+2}$.

For the first call from a terminal 4 during the encoding period $CP_n$, there is a corresponding row 1 in the encoding period $CP_{n+1}$, for the second call there is a corresponding row 2 and so on. This distribution is carried out as follows:

Encoding period $CP_n$:

Call 1 is distributed for $CP_{n+1}$

Call 2 is distributed for $CP_{n+1}$

Call 3 is distributed for $CP_{n+1}$

Call 4 is distributed for $CP_{n+1}$

Encoding period $CP_{n+1}$:

Call 1 is made according to the distribution, it keeps the row 1 for the encoding period $CP_{n+2}$;

A new call N takes row 2 for the encoding period $CP_{n+1}$ and is distributed for the encoding period $CP_{n+2}$;

Call 2 is made according to the distribution, and takes row 3 for the encoding period $CP_{n+1}$, and is distributed for the encoding period $CP_{n+2}$;

Call 3 is made according to the distribution, and takes row 4 for the encoding period $CP_{n+1}$, and is distributed for the encoding period $CP_{n+2}$;

Call 4 is made according to the distribution, and takes row 5 for the encoding period $CP_{n+1}$, and is distributed for the encoding period $CP_{n+2}$;

Encoding period $CP_{n+2}$:

Call 1 is not made, for example following disconnection of the user, it is no longer listed in the encoding period $CP_{n+2}$;

Call 2 is made according to the distribution, and takes row 1 for the encoding period $CP_{n+2}$, and is distributed for the encoding period $CP_{n+3}$;

Call 3 is made according to the distribution, and takes row 2 for the encoding period $CP_{n+2}$, and is distributed for the encoding period $CP_{n+3}$;

Call 4 is made according to the distribution, and takes row 3 for the encoding period $CP_{n+2}$, and is distributed for the encoding period $CP_{n+3}$;

Call 5 is made according to the distribution, and takes row 4 for the encoding period $CP_{n+2}$, and is distributed for the encoding period $CP_{n+3}$.

As previously described, the duration of an encoding period $CP_i$ may be modified by the portal 14 to take account of new unplanned connection requests during the previous encoding period $CP_1$. The purpose of this variation is to avoid call overloads at the portal 14. This principle applies to the broadcasting of television channels and also to the broadcasting of events in which the durations of the encoding periods are known and also to the broadcasting of events even if in this case the estimated duration of events are lower or close to those of an encoding period.

At the beginning of an encoding period, the portal 14 measures the density of calls and waits until the measured density is lower than a threshold set to trigger the distribution of the connection requests previously planned during the previous encoding period. This principle permits new connection requests to be absorbed.

In the case of TV channel broadcasting with identification of the content, the change of the encoding period is imposed at the start of new content, the TV portal then disposes of tools permitting it:

to measure the call load to indicate to the terminals 4 the time reference 27 from which they can connect to the portal 14 to obtain new individual keys;

to avoid accumulating unplanned calls and previously planned calls.

The reference date 27 is signalled to each terminal 4 by the change in phase of a specific call trigger signal 30 sent by the portal 14 to each terminal 4.

Figure 4:
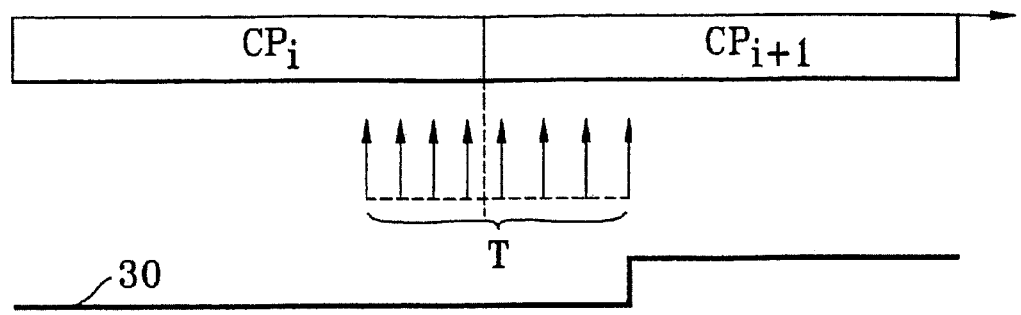
FIG. 4 illustrates diagrammatically an explanatory timing chart presenting on the one hand a period (T) loaded with new calls, and on the other hand the period where the calls are distributed.

This principle is illustrated diagrammatically by FIG. 4.

This figure represents diagrammatically two contents (content 1) and (content 2) of an audiovisual programme, successively broadcast during an encoding period $CP_i$, and during the encoding period $CP_{n+1}$. During the period T, several connection requests are sent to the portal 14 by terminals 4 that wish to connect for the first time in order to receive a set of deciphering keys. The density of calls during the period T is measured by the portal 14. This measurement of the call density permits the period of high call density to be identified, and to distinguish it from periods of low call density in order to programme the calls planned in advance in a period of low call density. In the case illustrated by FIG. 4, the portal 14 distributes the new connection requests after a change in phase of the signal 30 which occurs at the end of the period T.

In the case of the change in the encoding period not being imposed by the change of content of a programme, in order to decide the changes of the encoding periods, the portal 14 applies the following rules:

- the scrambling phase must have a duration at least equal to the minimum duration $CP_{min}$;
- the distribution of the calls planned during the previous encoding period as well as the time estimated for any possible recalls must be completed.

As explained above, the change of the encoding period and therefore the deciphering keys is synchronised with the change in phase of the signal 30.

To programme changes in the signal phase 30, the average number of calls received in a sliding time window of fixed duration, whose parameters can be set by the portal 14, must be lower than a predefined trigger threshold SDA representing a number of calls in a given time and whose value essentially depends on the portal 14. This threshold constitutes a performance indicator for the portal 14.

To this end, the portal 14 has several parameters which permit it to apply the rules defined above, including:

- the call distribution duration DRA, provided by the expression: $DRA(CP_n) = \Delta n + \epsilon$
- DRA represents the time required to process the calls in an encoding period increased by a safety period $\epsilon$.
- $\Delta n = $(No. of calls $(CP_{n-1})$*time to process a call) represents the largest call offset value allocated during the previous encoding period;
- $\epsilon = NEC*PERAP$, represents an estimated value to take account of the calls which are said to be unsuccessful during a first connection attempt to the portal 14, where:
  - NEC represents the number of failed connection attempts;
  - PERAP represents the periodicity of the calls in the absence of a response to a connection request.

Figure 5:
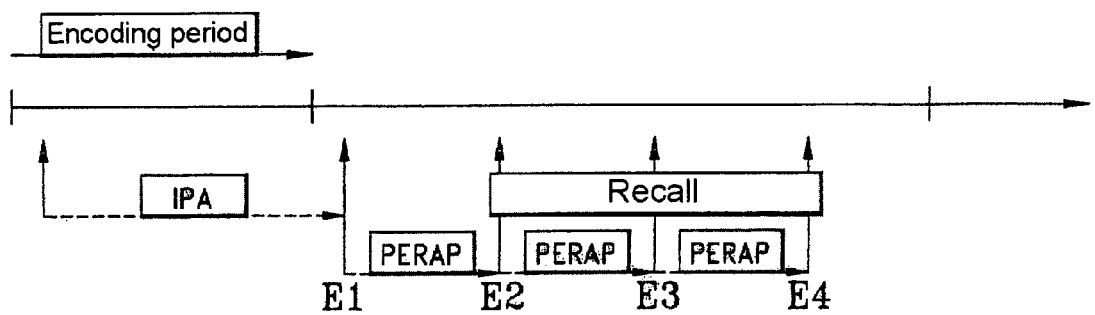
FIG. 5 illustrates diagrammatically an explanatory timing chart of the processing of the unsuccessful calls.

FIG. 5 illustrates diagrammatically the estimation of $\epsilon$ in the case of four unsuccessful calls E1 to E4. The estimation of the safety time $\epsilon$ takes into account the maximum recall time allocated to the last call distributed.

- An NMDA sampling window used to define the call references. This window has a fixed duration whose parameters can be defined at portal 14 level. It permits the average number of calls received in a given time to be calculated. This number is then compared with a call trigger threshold SDA to determine the changes in state of the call trigger signal 30. This window slides in increments of 1 second.
- the parameter SDA, already described, represents the call trigger threshold used by the portal 14 to process the absorption of the calls present apart from the calls related to the predefined distribution before the change of content.

The calls received during an encoding period that give rise to a recall, in the case of a valid subscription for example, are distributed inside the duration DRA during the following encoding period. The calls are taken into account within an encoding period as from a change of state of 30.

Figure 6:
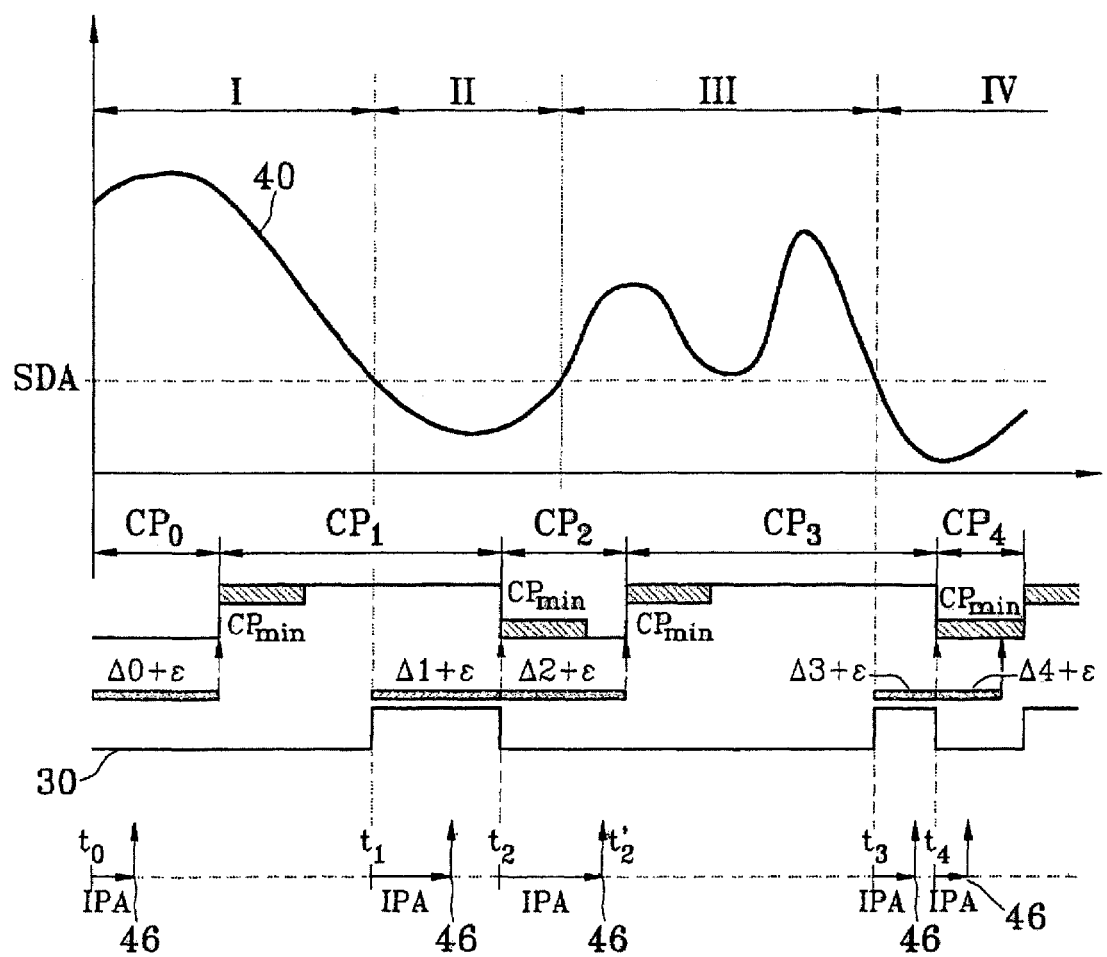
FIG. 6 illustrates diagrammatically a timing chart illustrating the variation of an encoding period according to the invention.

FIG. 6 illustrates the variation mechanism of the encoding period according to the parameters defined above. In this figure, reference 40 indicates the curve representing the variations in time of the average number of calls NMDA received by the portal 14. This curve varies around the value SDA of the predefined trigger threshold. Reference 46 indicates the connection requests received by the portal 14.

If the average number of calls NMDA is lower than or equal to the call trigger threshold SDA, the portal 14 decides to change the phase of the call trigger signal 30 if:

- the encoding period has a duration at least equal to the minimum duration $CP_{min}$, and
- the distribution of the planned calls during the previous encoding period as well as the duration DRA are completed.

In reference to FIG. 6, the instants $t_i$ (i=0, 1, 2, 3, ...) represent the reference 27 from which each terminal 4 calculates the time offset IPA following which it can once again connect to the portal 14 to collect a new set of deciphering keys.

The average number of calls NMDA in the interval I is greater than the call trigger threshold SDA, the portal 14 does not change the phase of the signal 30 which remains at low level between the instant $t_0$ and the instant $t_1$.

At this instant $t_1$, the average number of calls NMDA passes below the call trigger threshold SDA, the portal 14 commands the change of phase of the signal 30 which changes to the high level at the instant $t_1$, which corresponds to the end of the duration DRA1+$\epsilon$.

The signal 30 remains at the high level until the instant $t_2$, situated in the interval II in which the average number of calls NMDA is below the call trigger threshold SDA and the duration of the encoding period $CP_1$ is greater than $CP_{min}$. At this instant $t_2$, the portal 14 commands the change of phase of the signal 30, which changes to the low level at the end of the duration DRA1=$\Delta$1+$\epsilon$.

In the interval III, the average number of calls NMDA again passes above the call trigger threshold SDA, the portal 14 does not change the phase of the signal 30 regardless of the duration of the encoding period and regardless of the state of the duration DRA3. The signal 30 remains at the low level between the instant $t_2$ and the instant $t_3$.

In the interval IV, the average number of calls NMDA again passes below the call trigger threshold SDA, at the instant $t_3$, the duration of the encoding period $CP_3$ exceeds the duration $CP_{min}$, the portal 14 changes the phase of the signal 30 which passes to the high level at the instant $t_3$.

The portal 14 informs the scrambler 16, whose mission is to indicate this change in the signal 30. This transition is used by the terminals 4 to apply the distribution of calls during the passage from one encoding period to the following encoding period.

In the specific case of the broadcasting of private channels with identified contents, various contents are addressed in a same channel to different populations. The problem encountered with this type of broadcasting concerns the changes of contents. In fact, depending on the subscription taken or received, all or part of the population will have the right to view the contents.

To implement this service, the portal 14 must know the start dates and the duration of each content that it broadcasts. The principles described above are still applicable for this type of broadcasting.

According to one particular embodiment of the invention, the portal 14 distributes pairs of keys for the current content and the following content, whilst checking if the user making the request has taken out a subscription for the theme of the following event.

To this end, the portal 14 creates encoding periods which vary according to the criteria defined above for a same content. However, the portal 14 only creates a new encoding period if the time remaining before the end of a content is sufficient such that the distribution of the calls can be programmed.

Figure 7:
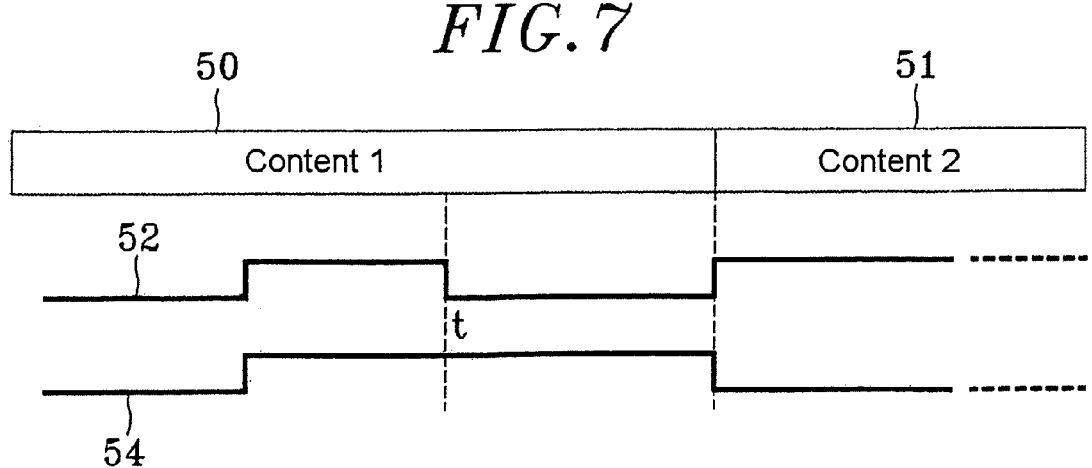
FIG. 7 illustrates diagrammatically an application of the process according to the invention in the case of broadcasting of programmes with an identified content.

FIG. 7 illustrates diagrammatically the implementation mechanism of this embodiment.

The references 50 and 51 represent two successive contents broadcast on the same channel.

Before carrying out the change of encoding period, the portal 14 tests if the time remaining before the end of the content is greater than the duration $CP_{min}+DRA$.

The reference 52 represents the evolution of the encoding period in the case where the time remaining for the broadcast of the content 50 is greater than $CP_{min}+DRA$.

In this case, the portal 14 changes the encoding period at the instant t.

The reference 54 represents the evolution of the encoding period in the case where the time remaining for the broadcast of the content 50 is les than $CP_{min}+DRA$.

In this case, the portal 14 does not change the phase of the signal 30.

At each encoding period of this content, the connected users request the receipt of the set of keys for the current period and for the following period. The portal 14 calculates them and checks if the user making the request has subscribed for the following type of content.

If the user has subscribed, the portal 14 will calculate the set of keys used for the following content and will send the two sets of keys to the user.

If the user has not subscribed, then only the set of keys for the current content will be sent.

The mechanism for distributing the keys is illustrated diagrammatically by FIG. 8.

Figure 8A:
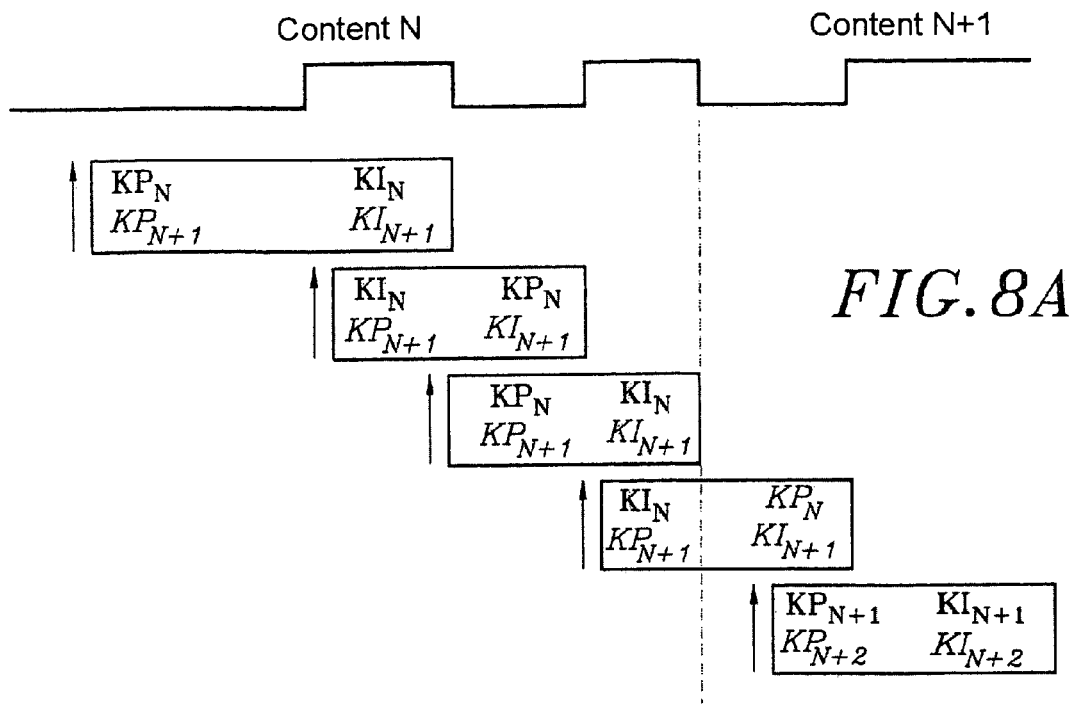
FIG. 8 illustrates diagrammatically an explanatory timing chart of the distribution of the keys in the applications of FIG. 7.

For the new connected users, the portal 14 distributes:
Two pairs of keys respectively comprising two even keys and two odd keys $(KP_N, KP_{N+1}), (KI_N, KI_N+1)$ if the user has subscribed to the current and following contents, as can be seen in FIG. 8A.

Figure 8B:
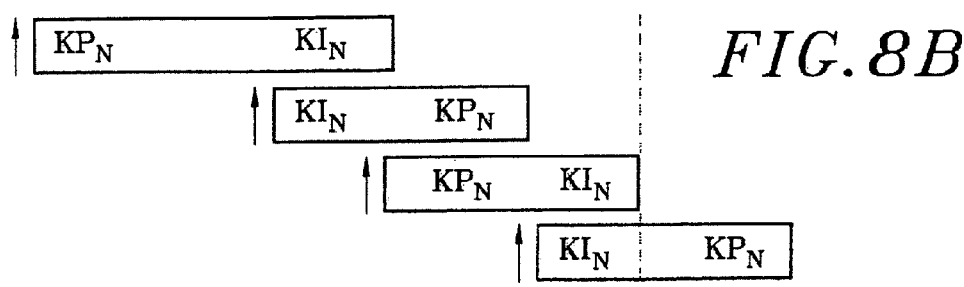
Figure 8C:
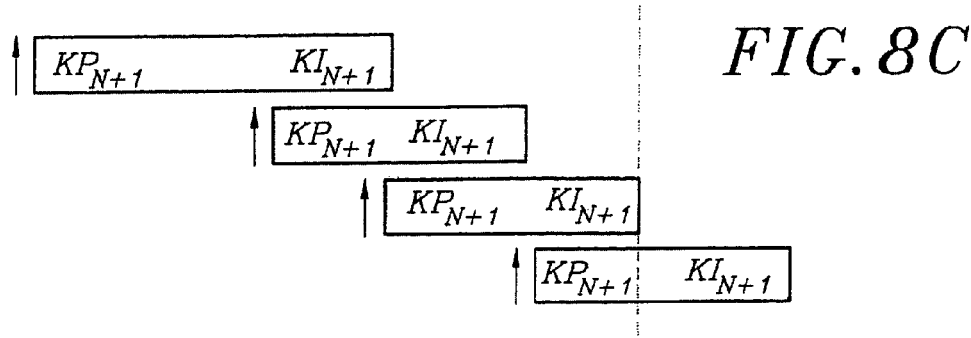

A pair of keys respectively comprising one even key and one odd key $(KP_N, KI_N)$ for the current content, if the user has not subscribed to the following content, as can be seen in FIG. 8B;

A pair of keys respectively $(KP_{N+1}, KI_{N+1})$ comprising one even key and one odd key for the following content, if the user has not subscribed to the current content, as can be seen in FIG. 8C.

A signal will be transmitted during each content transition. From this, the terminal 4 determines which set of keys is used to decipher the contents.

The portal 14 sends a complete set of keys for the following content as it does not know beforehand the parity of the phase at the beginning of the following content. In order for the terminal 4 to be able to know without any doubt which key has been allocated to a given parity, the set of keys sent for the following content will always be of the form:

Even key$_{N+1}$, Odd key$_{N+1}$.

Dialogue Between Portal 14—Scrambler

In order to implement this operation, the portal 14 must inform the scrambler 16 at each encoding period:
of the changes of scrambling phase;
of the changes of phase of call triggers;
of the changes of scrambling phase and contents.

The portal 14 must also ask the scrambler 16 for the scrambling parameters (ALEA1+CW) that will be used for the following encoding period.

Figure 9:
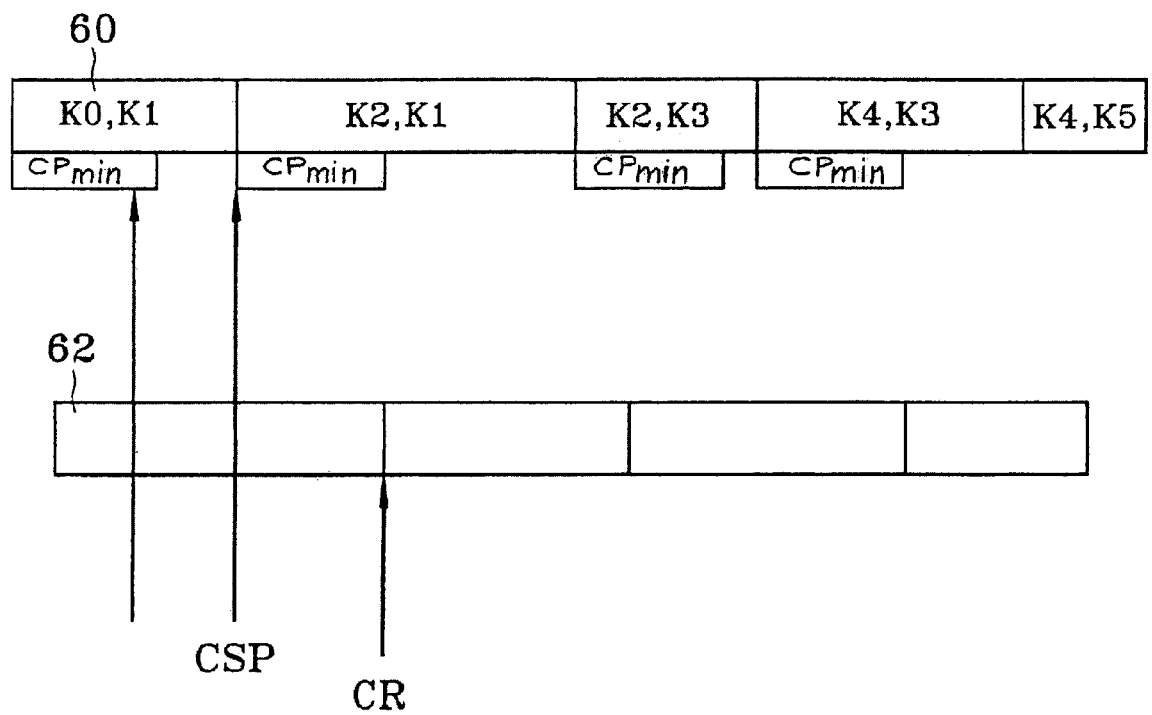
FIG. 9 illustrates the exchange of information between the reservation portal and the scrambler of the invention.

FIG. 9 illustrates diagrammatically the exchanges between the portal 14 and the scrambler during a broadcast.

The reference 60 represents the successive encoding periods with the corresponding deciphering keys, and the reference 62 represents the call trigger phases.

The portal 14 sends the following requests to the scrambler 16:

CR (Call_Reference): this function allows the change of phase of the call trigger signal 30 to be indicated to the scrambler 16.

CSP (Change_Scrambling_Phase): this function permits the scrambler to change the scrambling phase.

CP (Create_Profile_CA): this function permits a request to be made to the scrambler 16 to ask for the scrambling parameters that will be valid for a future encoding period. In return, the scrambler 16 provides the portal 14 with the ALEA1 and CW parameters requested. This request must be triggered before the end of the minimum duration of an encoding period $CP_{min}$.

Calculations Made by the Portal 14

The portal 14 comprises computer modules for:
calculating the duration of each encoding period;
calculating the number of calls received during an encoding period;
calculating the average number of calls received in order to trigger the distribution of the calls; this number is then compared with the threshold SDA.

Processing Unanswered Calls

The terminals 4 call the portal 14 regularly to collect the individual keys. If a call is unsuccessful, the strategy for repeat calls is as follows:
the number of reconnection attempts is limited to NEC calls (3 for example).
the periodicity of these attempts is PERAP minutes (2 or 3 for example). This repetition has an influence for estimating the parameter ϵ related to the duration of the distribution of the DRA calls.

The invention claimed is:

1. A method of distributing individual keys for deciphering scrambled digital content data transmitted by a broadcasting system including several terminals connected to a data exchange network, the broadcasting system having at least one portal to provide the individual keys, at least one scrambling platform and at least one server to broadcast the scrambled data, comprising:

dividing a scrambling period of the digital content data transmitted into a succession of encoding periods $CP_i$, $CP_{i+1}$, $CP_{i+2}$, each defining a period of validity of an individual deciphering key $K_i$, $K_{i+1}$, $K_{i+2}$, supplying, at each connection of a terminal to the portal, a set of individual keys comprising at least one key corresponding to the encoding period $CP_i$, and at least one key corresponding to the encoding period $CP_{i+1}$;

planning, during a given encoding period $CP_i$, during which a plurality of terminals connect to the portal, the distribution during the next encoding period $CP_{i+1}$ of dates of future connection for the plurality of terminals connected to the portal taking into account new connection(s) or disconnection(s) of terminal(s) as necessary; and supplying, at each connection of a terminal to the portal during said given encoding period $CP_i$, a set of individual keys comprising at least one key $K_i$ corresponding to the current encoding period $CP_i$, and at least one key corresponding to the next encoding period $CP_{i+1}$, the planned date of future connection of said terminal to the portal during the next encoding period $CP_{i+1}$ in order to collect a set of deciphering keys corresponding to at least one future encoding period $CP_{i+2}$, wherein the duration of an encoding period is permanently compared to a threshold value $CP_{max}$, and in that an alarm signal is generated by the portal when the encoding period reaches a duration equal to $CP_{max}$.

2. The method according to claim 1, wherein the duration of an encoding period is at least equal to a minimum duration $CP_{min}$ and depends on the number of terminals connected simultaneously to the portal.

3. A method of distributing individual keys for deciphering scrambled digital content data transmitted by a broadcasting system including several terminals connected to a data exchange network, the broadcasting system having at least one portal to provide the individual keys, at least one scrambling platform and at least one server to broadcast the scrambled data, comprising:

dividing a scrambling period of the digital content data transmitted into a succession of encoding periods $CP_i$, each defining a period of validity of an individual key Ki, supplying, at each connection of a terminal to the portal, a set of individual keys comprising at least one key corresponding to the encoding period $CP_i$, and at least one key corresponding to the encoding period $CP_{i+1}$; and supplying, at each connection a date of a future connection of the terminal to the portal to collect a set of deciphering keys corresponding to at least one future encoding period;

wherein the duration of an encoding period is permanently compared to a threshold value $CP_{max}$, and in that an alarm signal is generated by the portal when the encoding period reaches a duration equal to $CP_{max}$.

4. The method according to claim 3, wherein the connection of a terminal to the portal is initialized by a request transmitted from the terminal to the portal and in that the future connection date is defined by the portal.

5. The method according to claim 4, wherein the date of the future connection request is defined by a time offset with respect to a time reference defined according to a load of the portal.

6. The method according to claim 5, wherein the said time reference is signalled to each terminal by a change of phase of a specific call trigger signal.

7. The method according to claim 6, wherein the signal initializes a call distribution period representing a time necessary to process the connection requests during an encoding period $CP_i$.

8. The method according to claim 7, wherein the connection requests are taken into account by the terminal only once a change of state of the call trigger signal occurs.

9. The method according to claim 8, wherein the portal measures an average number of connection requests within a sliding time window of fixed duration, by counting a number of calls received within the said sliding time window.

10. The method according to claim 8, wherein the change in phase of the specific call trigger signal only takes place when the number of calls is below a predetermined call trigger threshold.

11. The method according to claim 10, wherein the encoding period is only changed if the duration of an encoding period $CP_i$ is greater than the minimum duration $CP_{min}$, and if the duration of the call distribution is complete.

12. The method according to claim 1, wherein the scrambled data represents an audiovisual program.

13. A device for distributing individual keys for deciphering digital content data broadcast in a data exchange network by a system having a reservation portal to provide the said individual keys, a scrambling platform and a scrambled data server, the device comprising:

means for dividing the scrambling period of the digital content data transmitted into a series of encoding periods $CP_i$, $CP_{i+1}$, $CP_{i+2}$, each defining a duration of validity for an individual deciphering key $K_i$, $K_{i+1}$, $K_{i+2}$, planning, during a given encoding period $CP_i$, during which a plurality of terminals connect to the portal, the distribution during the next encoding period ($CP_{i+1}$) of dates of future connection for the plurality of terminals connected to the portal taking into account new connection(s) or disconnection(s) of terminal(s) if need be, supplying, at each connection of a terminal to the portal during said given encoding period ($CP_i$), a set of individual keys comprising at least one key ($K_i$) corresponding to the current encoding period ($CP_i$), and at least one key corresponding to the next encoding period ($CP_{i+1}$), the planned date of future connection of said terminal to the portal during the next encoding period ($CP_{i+1}$) in order to collect a set of deciphering keys corresponding to at least one future encoding period ($CP_{i+2}$), wherein the duration of an encoding period is permanently compared to a threshold value $CP_{max}$, and in that an alarm signal is generated by the portal when the encoding period reaches a duration equal to $CP_{max}$.

14. The device according to claim 13, wherein the connection of a terminal to the portal is initialized by a connection request transmitted from the terminal to the portal and in that the connection date is defined by the portal.

15. The device according to claim 14, wherein the portal comprises means to vary the duration of an encoding period between a minimum duration $CP_{min}$ and a maximum duration $CP_{max}$ depending on the number of terminals connected simultaneously to the network.

* * * * *

UNITED STATES PATENT AND TRADEMARK OFFICE
CERTIFICATE OF CORRECTION

PATENT NO. : 7,693,281 B2 Page 1 of 1
APPLICATION NO. : 10/495439
DATED : April 6, 2010
INVENTOR(S) : Andre Codet et al.

It is certified that error appears in the above-identified patent and that said Letters Patent is hereby corrected as shown below:

Column 6, line 57, change "$CP_{n+1}$" to --$CP_{i+1}$--

Signed and Sealed this

Thirteenth Day of July, 2010

David J. Kappos
*Director of the United States Patent and Trademark Office*